(12) United States Patent
Kowalewski

(10) Patent No.: US 8,984,603 B2
(45) Date of Patent: Mar. 17, 2015

(54) COMMUNICATION DEVICE, METHOD FOR PROVIDING A DATA SERVICE, COMMUNICATION TERMINAL, AND METHOD FOR REQUESTING A DATA SERVICE

(75) Inventor: Frank Kowalewski, Goettingen (DE)

(73) Assignee: Intel Mobile Communications GmbH, Neubiberg (DE)

( * ) Notice: Subject to any disclaimer, the term of this patent is extended or adjusted under 35 U.S.C. 154(b) by 486 days.

(21) Appl. No.: 13/043,655

(22) Filed: Mar. 9, 2011

(65) Prior Publication Data

US 2012/0233677 A1 Sep. 13, 2012

(51) Int. Cl.
  *H04L 29/06* (2006.01)
  *H04L 9/32* (2006.01)
  *H04L 12/14* (2006.01)
  *H04W 12/12* (2009.01)
  *H04M 15/00* (2006.01)

(52) U.S. Cl.
  CPC .......... *H04L 9/3247* (2013.01); *H04L 12/1421* (2013.01); *H04L 63/126* (2013.01); *H04W 12/12* (2013.01); *H04M 15/51* (2013.01); *H04M 15/61* (2013.01); *H04L 12/1478* (2013.01); *H04L 63/164* (2013.01)
  USPC .............. 726/7; 380/233; 705/51; 705/52

(58) Field of Classification Search
  None
  See application file for complete search history.

(56) References Cited

U.S. PATENT DOCUMENTS

| | | | |
|---|---|---|---|
| 6,961,858 B2 * | 11/2005 | Fransdonk | 726/29 |
| 6,965,914 B2 * | 11/2005 | Dowling | 709/203 |
| 7,107,039 B2 | 9/2006 | Liao et al. | |
| 7,254,608 B2 * | 8/2007 | Yeager et al. | 709/203 |
| 7,290,286 B2 * | 10/2007 | Moharram et al. | 726/27 |
| 7,539,862 B2 * | 5/2009 | Edgett et al. | 713/168 |
| 7,568,095 B2 * | 7/2009 | Thornton et al. | 713/156 |

(Continued)

FOREIGN PATENT DOCUMENTS

EP   1422866 B1   3/2006

OTHER PUBLICATIONS

Talib, Muhammad Adeel; Colman, Alan; Han, Jun; King, Justin; Kapuruge, Malinda. A Service Packaging Platform for Delivering Services. 2010 IEEE International Conference on Services Computing (SCC). Pub. Date: 2010. Relevant pp. 202-209. http://ieeexplore.ieee.org/stamp/stamp.jsp?tp=&arnumber=5557233.*

(Continued)

*Primary Examiner* — Dede Zecher
*Assistant Examiner* — Jeremiah Avery
(74) *Attorney, Agent, or Firm* — Schwabe, Williamson & Wyatt, P.C.

(57) ABSTRACT

A communication device is described comprising a receiver configured to receive a message from a communication terminal indicating that the communication terminal requests a data service and indicating that a cost of providing the data service is to be associated with a provider of the data service and including security information; a determining circuit configured to determine, based on the security information, whether the communication terminal is authorized to be provided with the requested data service with a cost of providing the data service being associated with a provider of the data service; and a controller, configured to establish a communication connection for providing the data service and to associate a cost of the communication connection with the provider of the data service if the authorization has been successful.

17 Claims, 11 Drawing Sheets

(56) References Cited

U.S. PATENT DOCUMENTS

| | | | |
|---|---|---|---|
| 7,590,550 B2* | 9/2009 | Schoenberg | 705/2 |
| 7,624,444 B2* | 11/2009 | Gupta et al. | 726/23 |
| 7,668,778 B2 | 2/2010 | Asano | |
| 7,711,351 B2* | 5/2010 | Stafford et al. | 455/406 |
| 7,856,508 B2* | 12/2010 | Dowling | 709/237 |
| 8,321,584 B2* | 11/2012 | Dobbins | 709/238 |
| 8,347,355 B2* | 1/2013 | Mower et al. | 726/3 |
| 8,588,240 B2* | 11/2013 | Ramankutty et al. | 370/401 |

OTHER PUBLICATIONS

Jennings, Brendan; Malone, Paul. Flexible Charging for Multi-provider Composed Services using a Federated, Two-phase Rating Process. 10th IEEE/IFIP Network Operations and Management Symposium. Pub. Date: 2006. Relevant pp. 13-23. http://ieeexplore.ieee.org/stamp/stamp.jsp?tp=&arnumber=1687534.*

Cisco Service Control Solutions: Facilitate Content-Based Charging and New Business Models, http://www.cisco.com/en/US/prod/collateral/ps7045/ps6129/ps6150/prod_brochure0900aecd80257186html (3 pages).

Content Based Billing, The data delivery mechanism that enables maximum revenue at deployment, http://www.motorola.com/staticfiles/Business/Solutions/Industry%20Solutions/Service%20Providers/Wireless%20Operators/GSM/Network%20Overview/_Documents/Static%20files/6873_MotDoc.pdf?localeId=33 (14 pages).

NetSpira ECS Platform, Build mobile revenue with content-based services, http://www.stratus.com/pdf/telecom/ecs.pdf (2 pages).

IP Multimedia Subsystem, http://de.wikipedia.org/wiki/IP_Multimedia_Subsystem, (7 pages).

English language abstract for EP 1422866 B1.

IETF Request for Comments RFC2408; "Internet Security Association and Key Management Protocol (ISAKMP)"; D. Maughan et al., Nov. 1998; http:/www.ietf.org/rfc2408.txt.

IETF Request for Comments RFC5246; "The Transport Layer Security (TLS) Protocol Version 1.2"; T. Dierks et al., Aug. 2008; https://datatracker.ietf.org/doc/rfc5246.

IETF Request for Comments RFC2401; "Security Architecture for the Internet Protocol"; S. Kent et al., Nov. 1998; http://www.ietf.org/rfc/rfc2401.txt.

IETF Request for Comments RFC4301; "Security Architecture for the Internet Protocol"; S. Kent et al., Dec. 2005; http://www.ietf.org/rfc/rfc4301.txt.

English-language abstract / summary of IP Multimedia Subsystem.

* cited by examiner

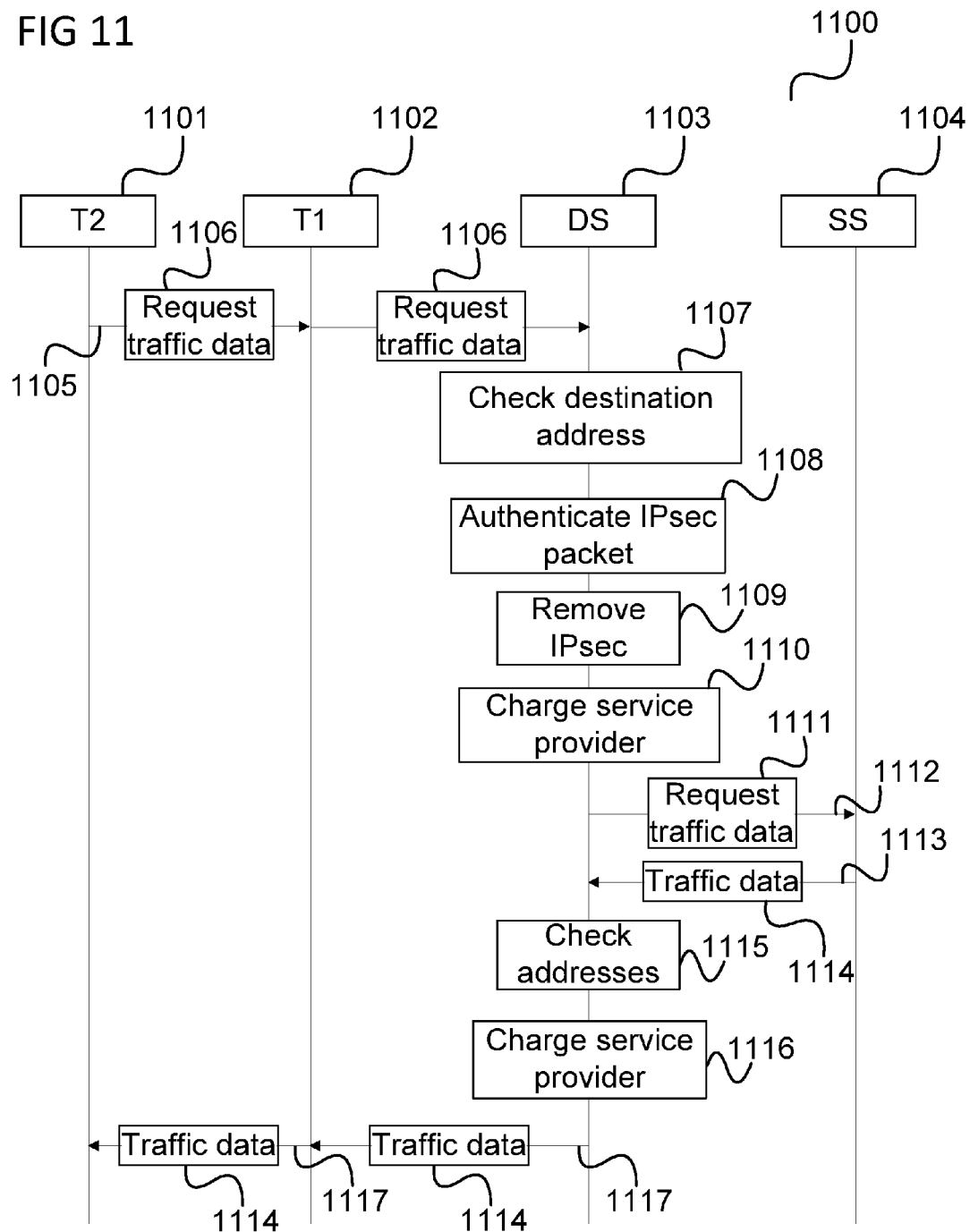

COMMUNICATION DEVICE, METHOD FOR PROVIDING A DATA SERVICE, COMMUNICATION TERMINAL, AND METHOD FOR REQUESTING A DATA SERVICE

TECHNICAL FIELD

Embodiments generally relate to a communication device, a method for providing a data service, a communication terminal, and a method for requesting a data service.

BACKGROUND

For charging of a communication service provided by a communication network, the communication service is typically associated with a subscription (i.e. a subscriber of the communication network, for example). Through the association, the costs for providing the communication service can be charged to the subscriber. A communication service may be associated with a subscription by registering for the service with an identifier of the subscription before starting the service. Data transmissions in context of the service may then be charged to the associated subscription. Flexible methods for associating a requested communication service with a subscription (i.e. a communication terminal, for example) are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIG. 11 shows a message flow diagram according to an embodiment.

DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Figure 1:
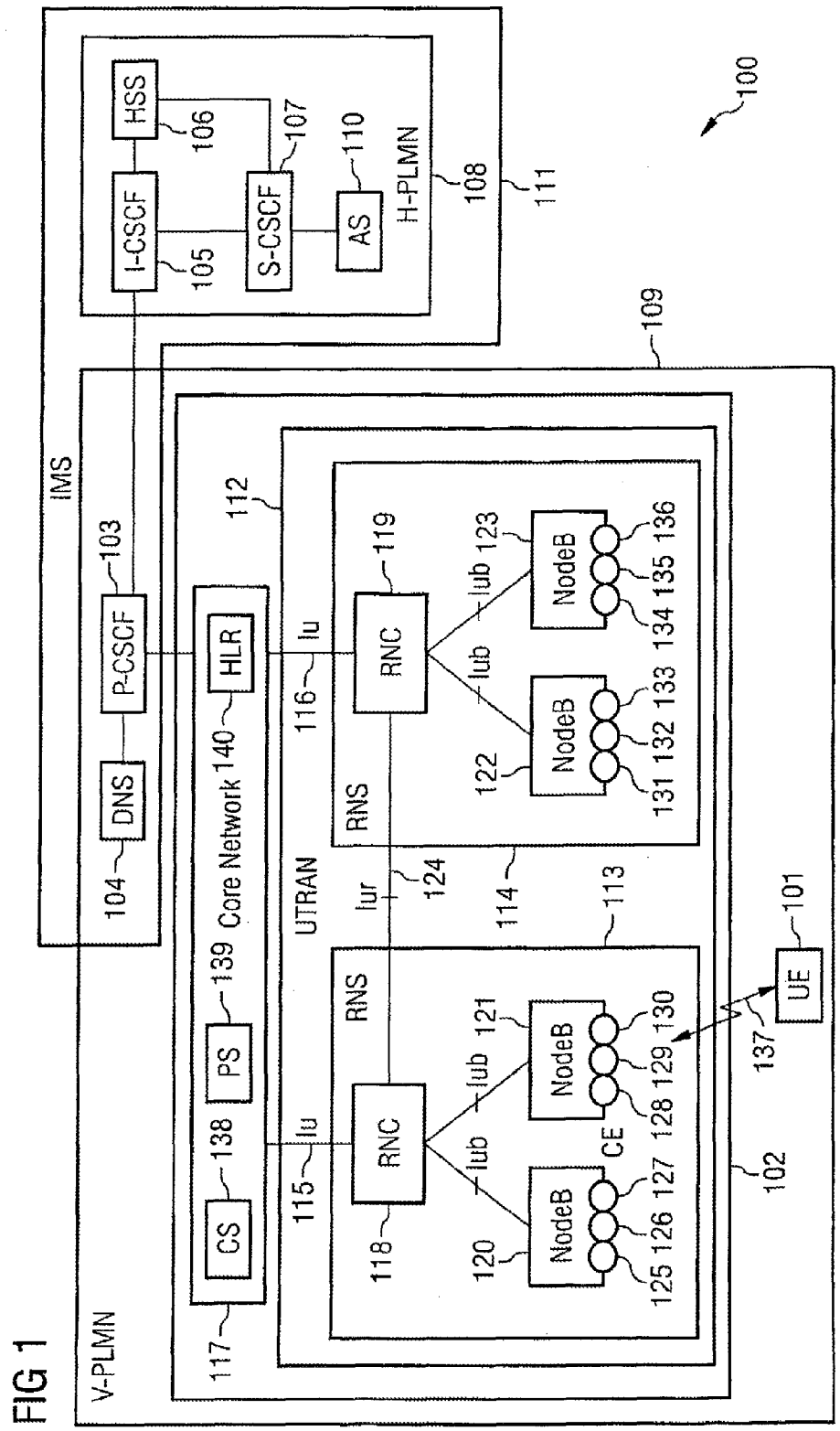
FIG. 1 shows a communication system based on an exemplary embodiment of the invention.

FIG. 1 shows a communication system 100 based on an exemplary embodiment of the invention.

In this example, the communication system 100 has the UMTS architecture described by 3GPP and includes an IMS (IP (Internet Protocol) Multimedia Subsystem) 111.

In the communication system 100, a communication terminal 101 is coupled to an IMS 111 by means of an access network 102.

The access network 102 is in this example a mobile radio communication network based on the UMTS standard including a core network 117 and a Universal Terrestrial Radio Access Network (UTRAN) 112 allowing the communication terminal to access the IMS 111 using a packet switched domain. The access network 102 may also be an access network according to GSM (Global System for Mobile Communication) or according to LTE (Long Term Evolution), for example.

In this example, the access network 102 has an architecture according to UMTS. Accordingly, the radio access network 112 is in this example a UMTS terrestrial radio access network (UTRAN).

The radio access network 112 has two or more radio network subsystems (RNS) 113, 114 which are each coupled to the UMTS core network 117 by means of an Iu interface 115, 116.

The RNS 113, 114 have a respective radio network control unit (Radio Network Controller, RNC) 118, 119, as well as one or more base stations 120, 121, 122, 123, also referred to as NodeBs according to UMTS.

The RNCs 113, 114 of different RNS 101, 102 are coupled to one another by means of an Iur interface 124. Each base station 120 to 123 of an RNS 113, 114 is coupled to the RNC 118, 119 of the RNS 113, 114 by means of an Iub interface. Furthermore, each base station 120 to 123 of an RNS 113, 114 operates one or more radio cells 125 to 136 within the RNS 113, 114. The RNC 118, 119 of an RNS 113, 114 monitors the allocation of radio resources to the radio cells 125 to 136 in the RNS 113, 114.

Message signals and data signals are transmitted by means of an air interface (Uu) 137, preferably by means of a multiple access transmission method, between a base station 120 to 123 and the communication terminal (also referred to as user equipment (UE) according to UMTS) 101 in a radio cell 125 to 136.

By way of example, separate signal transmission is achieved in the UMTS FDD (Frequency Division Duplex) mode in the uplink direction and downlink direction by appropriate separate assignment of frequencies or frequency bands. The expression uplink means the signal transmission from the user equipment 101 to a base station 120 to 123 while a downlink is the signal transmission from a base station 120 to 123 to the user equipment 101.

The signals for different user equipments and from different user equipments in the same radio cell may for example be separated by means of orthogonal codes, for example by means of the so-called CDMA (Code Divsion Multiple Access) method.

The core network 117 includes a Circuit-Switched (CS) Domain 138, a Packet-Switched (PS) Domain 139 and a Home Location Register (HLR) 140.

The CS Domain 138 for example includes a Mobile Switching Center (MSC), a GMSC (Gateway Mobile Switching Center), a VLR (Visitor Location Register) and forms an interface for circuit-switched communication connections between the radio access network 112 and external public communication networks such as a PSTN (Public Switched Telephone Network) or an ISDN (Integrated Services Digital Network).

The core network 117 further has a PS domain 139 which for example includes a SGSN (Serving GPRS Support Node) and a GGSN (Gateway GPRS Support Node) and forms the interface for packet-switched connections between the mobile radio network 112 and external packet-based data networks, such as the Internet, and provides access to the IMS 111. Accordingly, the PS domain 139 performs all functions to ensure the transport of packet-switched data. In addition, it allows signaling messages to be transported to the IMS 111. The core network 117 also has an HLR 140, which is a central database storing all of the subscriber information required to set up connections and to manage services.

It should be noted that the access network 102 may also be a landline network, for example the communication terminal 101 may have an apparatus which permits access to the Internet, for example a DSL (Digital Subscriber Line) modem, and the communication terminal could be coupled to the IMS 111 by means of the Internet.

Generally, the communication terminal 102 may for example be a mobile telephone or a computer with or without a radio module.

The access network 102 couples the communication terminal 102 to a P-CSCF (CSCF: Call Session Control Function, P-CSCF: Proxy-CSCF) 103 in the IMS 111. The P-CSCF 103 serves as an exchange and is coupled to a DNS (Domain Name Server) 104 and to an I-CSCF (Interrogating CSCF) 105. The I-CSCF 105 is coupled to an HSS 106 (Home Subscriber Server) 106 and to an S-CSCF (Serving CSCF) 107. The S-CSCF 107 is coupled to a plurality of application servers, only one application server (AS) 110 of which is shown. The communication terminal 101, the access network 102, the P-CSCF 103 and the DNS 104 are for example part of the visited network (V-PLMN) 109.

The I-CSCF 105, the HSS 106, the S-CSCF 107 and the application server AS 110 are for example part of the home communication network (H-PLMN) 108.

The P-CSCF 103, the I-CSCF 105, the HSS 106 and the S-CSCF 107 are a part of the IMS (IP Multimedia Core Network Subsystem) 111.

Using the communication terminal 101, a user can use the communication services of the IMS 111, for example can send an "instant message" to another communication terminal coupled to the communication system 100 or can hold a conference with users of other communication terminals coupled to the communication system 100.

According to one embodiment, in case a communication terminal wants to use a communication service, it registers for the service with a subscription identifier (ID) before starting the service. For example, for using a UMTS service, the communication terminal 101 registers with its international mobile subscriber identity (IMSI) at the mobile switching center (MSC) of the CS domain 138. For using an IMS service, the communication terminal, operating as an IMS client, registers with its IP Multimedia Private Identity (IMPI) at the Serving Call Session Control Function (S-CSCF) 107.

Subscription identifiers like IMSI and IMPI are for example stored on a Universal Integrated Circuit Card (UICC) included in the communication terminal 101 which for example implements a Universal Subscriber Identity Modules (USIM).

Through the registration the registered subscription of the communication terminal 101 may be associated with the provided service. Service provision (e.g. data transmission service or application service provision) may be charged to the associated subscription, i.e. to the communication terminal 101. Data transmission charging can for example be based on transmission time, on data volume or on data content of the data transmitted in context of the service usage (or service provision).

For data content based charging, transmitted packets may be analyzed by deep packet inspection. Content may be classified e.g. based on source IP address, destination IP address, port numbers, protocol and/or URL (Uniform Resource Locator). The data can be charged depending on the identified content class.

Transmitted data may also include service class indicators. Charging may depend on the included service class indicators.

A service request message sent by the communication terminal 101 may be signed by the communication terminal 101. The service provider may forward the signature to a bank for service payment. The bank may verify the validity of the payment request based on the signature. Signing of data to be transmitted or a message may be negotiated between the connected peers (i.e. the communication devices that exchange the data or message) at connection setup between the communication devices by establishing a corresponding security association (SA). The SA describes how the peers will utilize the security functionalities. For example, Transport Layer Security (TLS) and its predecessor, Secure Socket Layer (SSL), can be used for signing transmitted data or messages. The use of TLS/SSL typically needs to be designed into an application to protect the application protocols.

Application services may for example be charged depending on the application service being used. For example, the IP Multimedia Subsystem (IMS) 111 allows for application specific charging. However, the IMS is not yet widely deployed and it is complex to deploy IMS. Further, when not using IMS based application services a data transmission providing operator cannot charge based on application usage in this way.

The possibility to use a communication service (e.g. free of charge) may be included when a particular communication terminal is purchased. For example, the communication terminal manufacturer may have subscribed to the communication service so that he can be charged for the service when being used by the buyer of the communication terminal For example, an eBook reader may provide communication services for downloading electronic books and for basic web surfing for the user free of charge when purchased. The cost of the usage of the communication service is not being charged to the communication terminal user but to the manufacturer or vendor of the eBook reader. Other devices for using communication services for which the device manufacturer is charged instead of the user may for example be remote automotive diagnosis systems and navigation devices. However, when using such device manufacturer subscriptions a modem may need to be integrated into the communication terminal. Further, for every communication terminal a subscription with its own identity module circuit card (e.g. a UICC) may need to be set up. A UICC may be removed from the communication terminal and may be misused by placing it into other devices. For example, a SIM might be removed from an eBook reading device with very limited web browsing capabilities in order to be used with a more sophisticated web browsing device. Further, multiple subscriptions per device (e.g. private/business) may require multiple subscription IDs and usually multiple UICCs. Multiple subscriptions on a single device may not allow simultaneous use of the subscriptions.

Additionally, when using mobile application services provided by other providers than the data transmission providing provider it may be necessary that the user subscribes separately for every involved service.

When using an external modem with a service providing device the external modem subscription may be additionally charged for service traffic (if the data transmission subscription is not a flat rate subscription).

According to one embodiment, particular data being transmitted in context of a communication service may be associated with a third party subscription, thereby enabling to charge the third party subscriber for the transmitted data. According to one embodiment, the association is made secure such that it is not possible for a potential attacker to use a third party's subscription without permission to do so.

Figure 2:
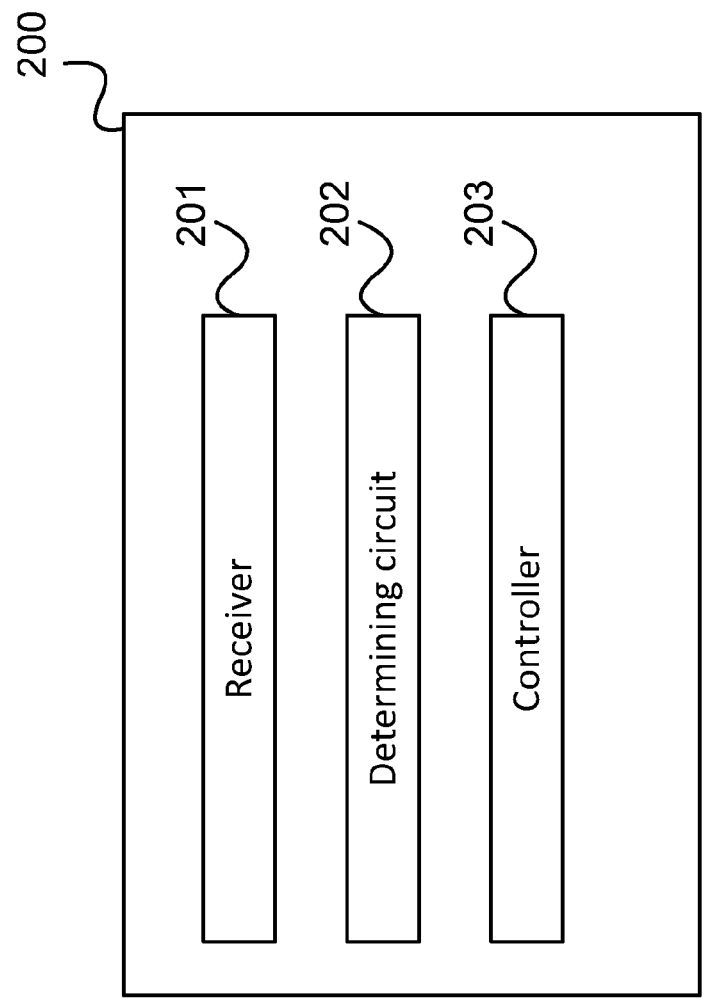
FIG. 2 shows a communication device according to an embodiment.

According to one embodiment, a communication device is provided as illustrated in FIG. 2.

FIG. 2 shows a communication device 200 according to an embodiment.

The communication device 200 includes a receiver 201 configured to receive a message from a communication terminal indicating that the communication terminal requests a data service and indicating that a cost of providing the data service is to be associated with a provider of the data service and including security information.

Further, the communication device 200 includes a determining circuit 202 configured to determine, based on the security information, whether the communication terminal is authorized to be provided with the requested data service with a cost of providing the data service being associated with a provider of the data service.

The communication device 200 further includes a controller 203 configured to establish a communication connection for providing the data service and to associate a cost of the communication connection with the provider of the data service if it has been determined that the communication terminal is authorized to be provided with the requested data service with a cost of the data service being associated with a provider of the data service.

According to one embodiment, in other words, a data service (e.g. a data communication service) is requested using a signed message that indicates that a third party is to be charged for the costs. The authorization of the communication terminal for being provided with the data service and the charging in this way is checked by a communication device, e.g. a component of a communication network involved in the communication service (e.g. an access network for example providing a communication connection for the communication service). In other words, it is verified based on the security information that the communication terminal is authorized to be provided with the service with the costs being allocated to the service provider. According to one embodiment, data transmitted within a particular communication service (specifically a request for provision of the communication service) is signed. The signature being used for example depends on a third party subscription that is wanted to be used. A component of a communication network involved in the communication service (e.g. providing a communication connection for the communication service) may inspect the signature and associate a third party subscription with the transmitted data depending on the inspection result.

According to one embodiment, the data service includes communicating data to the communication terminal and the provider of the data service is a provider of the data to be communicated to the communication terminal.

The data communicated to the communication terminal is for example provided by a service server device.

According to one embodiment, the communication device is part of a communication network.

The controller may for example be configured to control a component of a communication network to establish the communication connection.

The provider of the data service is for example a subscriber of the communication network.

According to one embodiment, the communication terminal is a user terminal of the communication network.

According to one embodiment, the message indicates that a cost of the data service is to be associated with the provider of the data service by a destination address of the message.

The address is for example an address of the communication device or of a service server device providing data to be communicated in the data service.

The destination address may for example be an IP address.

The security information may be understood as information allowing the receiver to check whether the communication terminal is authorized to be provided with the requested data service with a cost of providing the data service being associated with a provider of the data service. In one embodiment, the security information may be seen as authentication information. For example, the security information is signing information.

According to one embodiment, the security information is a hash of at least a part of the message.

The message is for example an IPsec message, i.e. a message in accordance with IPsec.

The security information for example includes at least one of at least a part of the message being signed with a private key and a hash value of at least a part of the message being signed with a private key.

The determining circuit may for example be configured to determine whether the communication terminal is authorized to be provided with the requested data service with a cost of providing the data service being associated with a provider of the data service using a public key corresponding to the private key.

Internet Protocol Security (IPsec) is a protocol suite for securing Internet Protocol (IP) communications by authenticating and encrypting IP packets. IPsec protects any application traffic across an IP network. Applications do not need to be specifically designed to use IPsec. IPsec can be used in transport mode or in tunnel mode. Transport mode provides a secure connection between two endpoints and encapsulates IP payload only. Tunnel mode encapsulates the entire IP packet to provide a virtual "secure hop" between two gateways. It may typically be used in a VPN (Virtual Private Network) where the tunnel generally creates a secure tunnel across an untrusted Internet.

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

Figure 3:
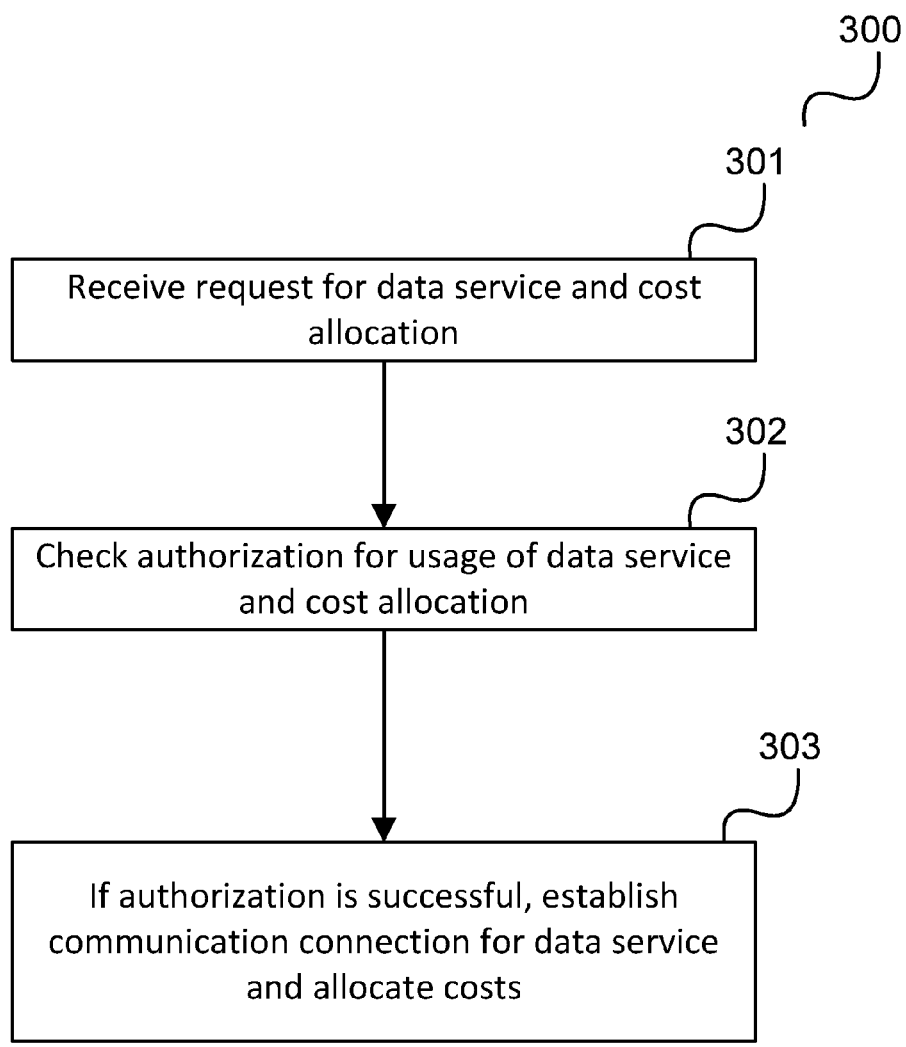
FIG. 3 shows a flow diagram according to an embodiment.

The communication device 200 for example carries out a method as illustrated in FIG. 3.

FIG. 3 shows a flow diagram 300 according to an embodiment.

The flow diagram 300 illustrates a method for providing a data service.

In 301, a message is received from a communication terminal indicating that the communication terminal requests a data service and indicating that a cost of providing the data service is to be associated with a provider of the data service and including security information.

In 302, it is determined, based on the security information, whether the communication terminal is authorized to be provided with the requested data service with a cost of providing the data service being associated with a provider of the data service.

In 302, a communication connection for providing the data service is established and a cost of the communication connection is associated with the provider of the data service if it has been determined that the communication terminal is authorized to be provided with the requested data service with a cost of the data service being associated with a provider of the data service.

Figure 4:
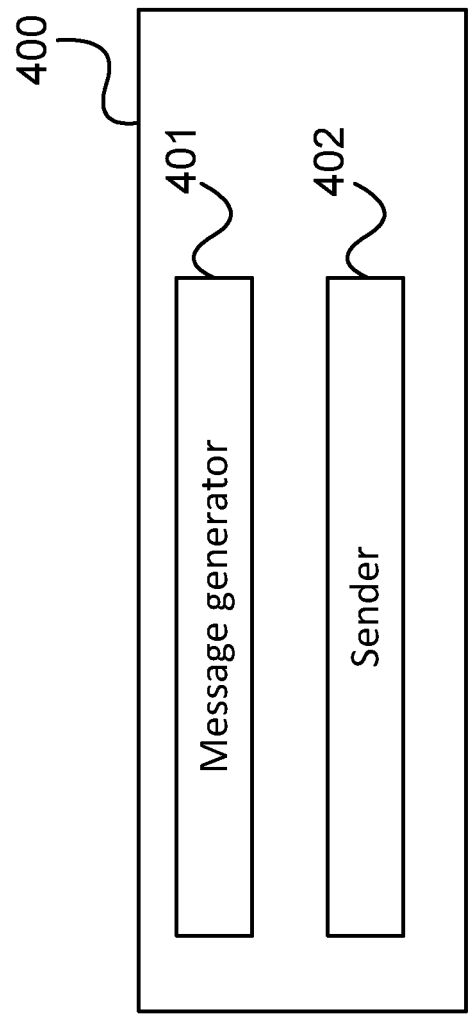
FIG. 4 shows a communication terminal according to an embodiment.

The communication terminal for example has the structure as shown in FIG. 4.

FIG. 4 shows a communication terminal 400 according to an embodiment.

The communication terminal 400 includes a generating circuit 401 configured to generate a message indicating that the communication terminal requests a data service and indicating that a cost of providing the data service is to be associated with a provider of the data service and including security information allowing determination whether the communication terminal is authorized to be provided with the requested data service with a cost of providing the data service being associated with a provider of the data service.

The communication terminal 400 further includes a sender 402 configured to send the message to a communication device, e.g. the communication device 200 shown in FIG. 2.

Figure 5:
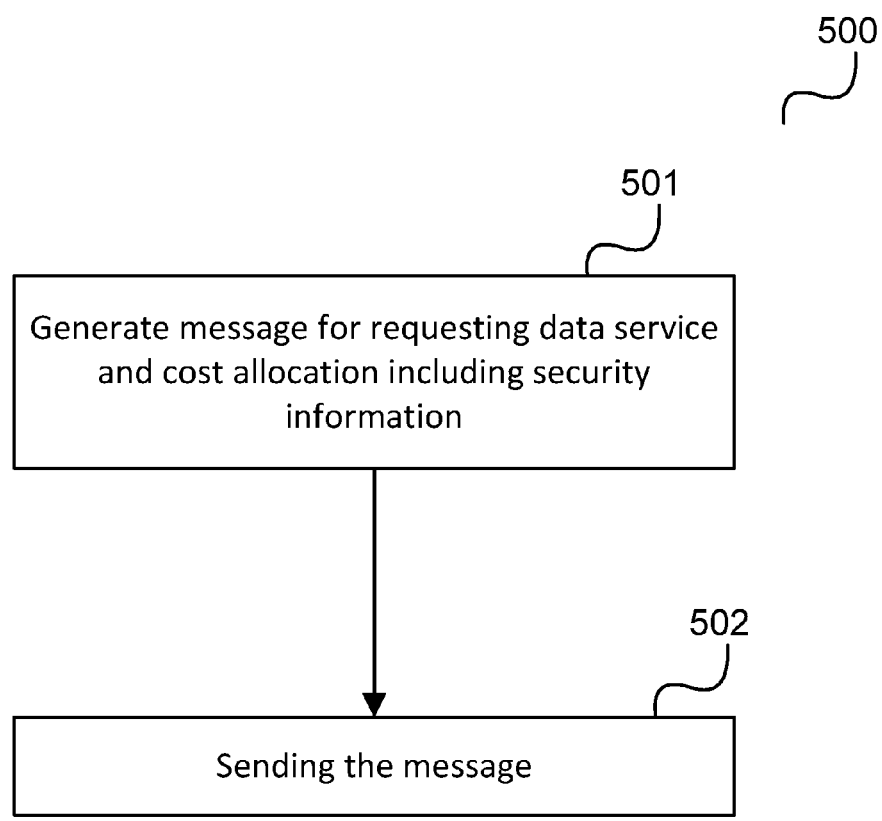
FIG. 5 shows a flow diagram according to an embodiment.

The communication terminal 400 for example carries out a method as illustrated in FIG. 5.

FIG. 5 shows a flow diagram 500 according to an embodiment.

The flow diagram 500 illustrates a method for requesting a data service. In 501, a message is generated which indicates that the communication terminal requests a data service and which indicates that a cost of providing the data service is to be associated with a provider of the data service and including security information allowing determination whether the communication terminal is authorized to be provided with the requested data service with a cost of providing the data service being associated with a provider of the data service.

In 502, the message is sent to a communication device.

It should be noted that embodiments described in context with the communication device are analogously valid for the communication terminal, the method for providing a data service and the method for requesting a data service and vice versa.

According to one embodiment, the message includes an indication of the subscription to be associated with the provision of the communication service, i.e. for example includes an identification of a subscriber (e.g. by means of a subscription identification) which is to be charged for the costs of providing the data service, e.g. a subscriber of the communication network providing the communication connection used to provide the data service.

A subscription may for example be indicated by an IP address or a port or by a Security Parameters Index (SPI) or by authentication data.

For signing, IPsec may be used. IPsec may be used in transport mode or in tunnel mode. If IPsec is being used in transport mode then the IPsec header may or may not be removed by the communication device.

Security information (such as a destination IP address for IPsec tunneling, an SPI or a private key for signing) may be stored in the communication terminal (e.g. by means of an identity module circuit card such as UICC) and/or may be signaled to the communication terminal from a subscription information server.

The signature may be inspected (i.e. authorization may be checked) by several communication devices, e.g. by a communication device of each mobile communication network involved in the provision of the data service, or by only a single communication device which informs other mobile communication networks about the inspection result.

Transmitted data (in particular the message including the request) may be routed depending on signature inspection results.

Embodiments allow using device manufacturer subscriptions with external modems. The manufacturer's device (i.e. the communication terminal) does not need to provide the communications modem for the data communication. Further, according to an embodiment, device manufacturer provided communication services do not require a subscription for every device. Accordingly, it is not required that UICCs are used by the devices. In an embodiment where a UICC is used the UICC does not need to be application specific. According to an embodiment, a UICC removed from a communication terminal using device manufacturer provided communication services cannot be used with another communication device. Therefore a removed UICC cannot be misused.

According to an embodiment, mobile application services can be provided without multiple subscriptions for data transmission and application service providing providers. Further, embodiments may allow application specific charging without requiring an IMS.

When using an external modem with a service providing device embodiments allow charging device manufacturers or application service providers for data transmission. Embodiments further allow using multiple subscriptions per device (e.g. private/business) with a single subscription ID and a single UICC. Additionally, multiple subscriptions on a single device can be used simultaneously.

The mechanisms of embodiments may be used as a SIM lock mechanism.

Embodiments do not require the data service providing provider or any other involved provider to explicitly support the embodiments, i.e. embodiments may be compatible with existing provider technology.

Embodiments allow using a single (IP-) data connection to be used by multiple subscriptions. This reduces signaling overhead.

According to one embodiment, the data service is a wired communication service.

In the following, examples of the operation of the communication device 200 and the communication terminal 400 are described.

Figure 6:
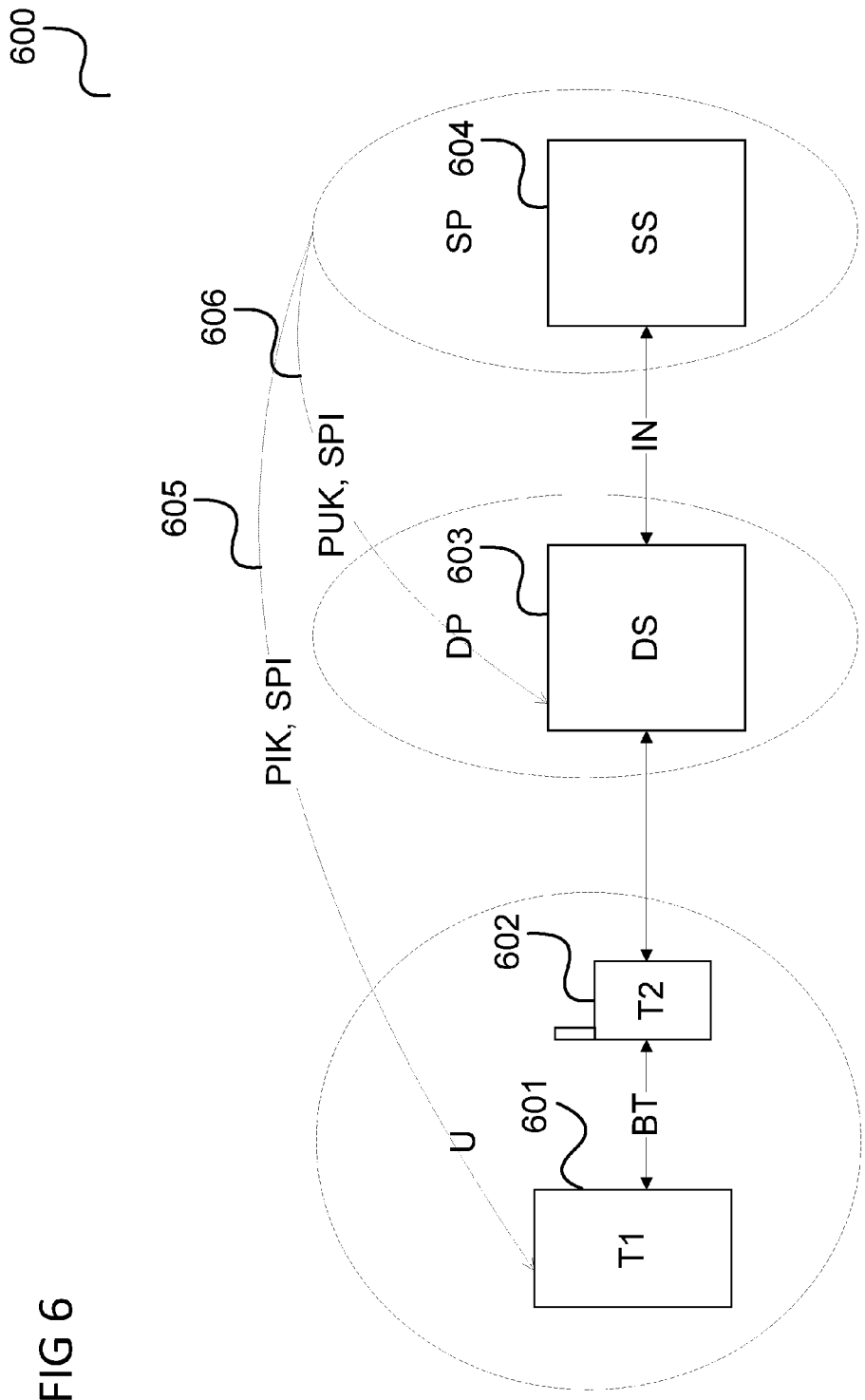
FIG. 6 shows a communication system according to an embodiment.

FIG. 6 shows a communication system 600 according to an embodiment.

The communication system 600 in this example has an architecture for eBook download with third party subscription.

The communication system 600 includes a communication terminal 601, for example corresponding to the communication terminal 101 and/or the communication terminal 400, an external modem, in this example a mobile phone 602 connected to the communication terminal 400 via Bluetooth, a data server (or data server computer) 603, for example corresponding to the communication device 200, which is for example part of the access network 102 and connected to the mobile phone 602 via air interface 137, and a (data) service server (or (data) service server computer) 604, in this example an eBook download service server, for example connected to the data server 603 via the Internet.

The communication terminal 601 and the mobile phone 602 may be seen to be part of the user side, the data server 603 may be seen to be part of the data provider (or communication provider) side and the service server 604 may be seen to be part of the service provider side.

The communication terminal 601 is in this example an eBook reader device allowing downloading eBooks to the communication terminal 601. The message flow for a downloading process according to an embodiment is illustrated in FIG. 7.

Figure 7:
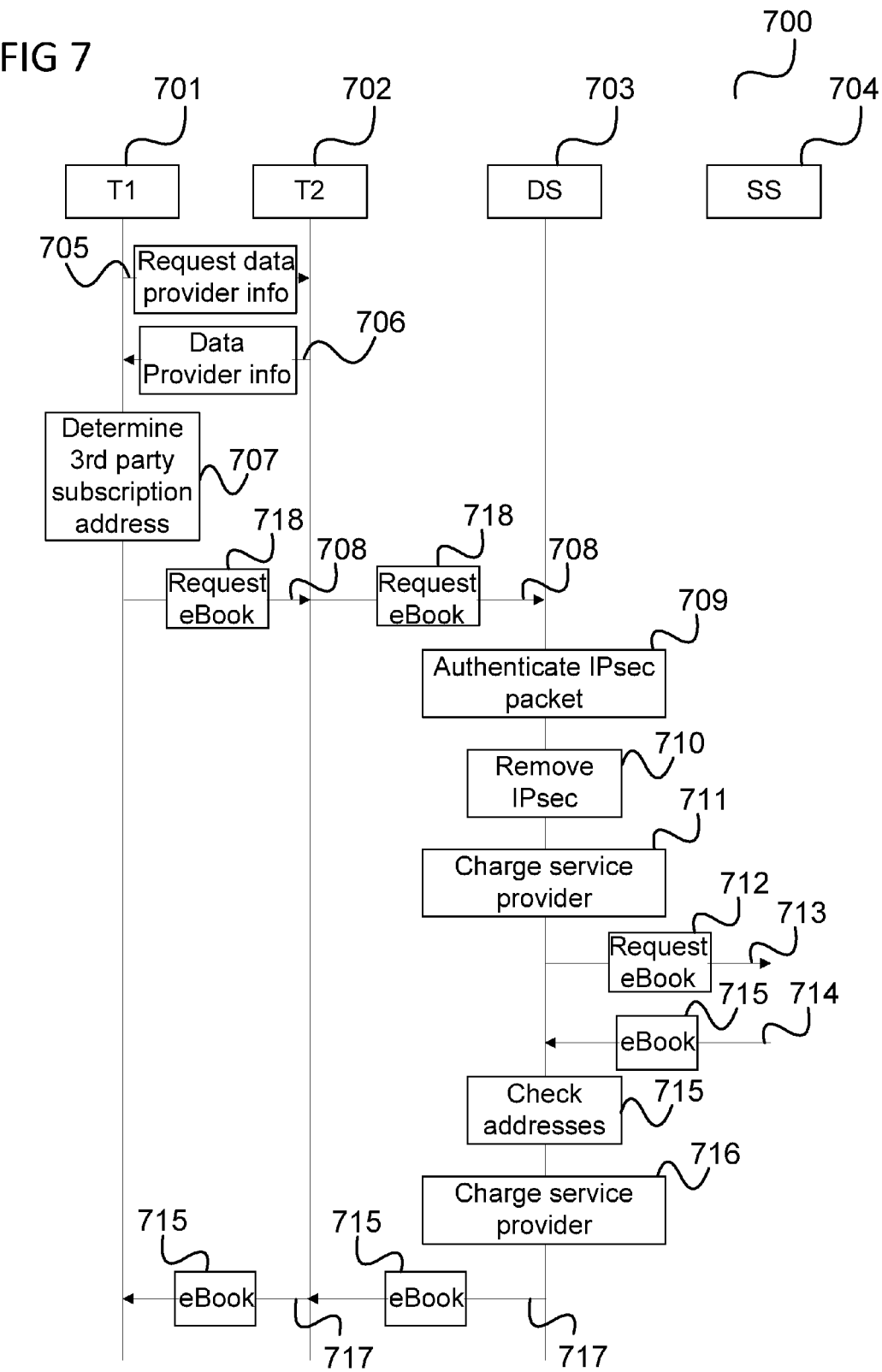
FIG. 7 shows a message flow diagram according to an embodiment.

FIG. 7 shows a message flow diagram 700 according to an embodiment.

The message flow takes place between a communication terminal 701 corresponding to the communication terminal 601, a mobile phone 702 corresponding to the mobile phone 602, a data server 703 corresponding to the data server 603, and a service server 704 corresponding to the service server 604.

For downloading an eBook the communication terminal 701 connects, in this example via Bluetooth, to the mobile phone 702 (e.g. a mobile phone providing Internet connection). It is assumed that the user of the communication terminal 701 has been subscribed to a data transmission service for his mobile phone 702. In the following the provider providing the data transmission service, i.e. the service for transmitting requested data, in this case the eBook, for example by providing a mobile telephone network communication connection, is called data provider (for example operating the data server 703). The eBook download service (also referred to as the data service) is being provided by a different eBook download service provider (i.e. an application service provider), e.g. operating the service server 704. The eBook download service may for example be provided by the eBook reader device manufacturer, i.e. the manufacturer or vendor of the communication terminal 701.

It is assumed that the communication terminal 701 is connected to the Internet via the mobile phone 702 and that the user of the communication terminal 701 chooses to download an eBook.

In 705, the communication terminal 701 first requests from the mobile phone 702 to identify the data provider being used by the mobile phone 702. In 706, the communication terminal 701 receives the requested data provider information and after that, in 707, the communication terminal 701 determines a special $3^{rd}$ party subscription IP address associated with the data provider 703 from a list of data providers stored on the communication terminal 701.

In 708, the communication terminal 701 sends an eBook download request message 718 to the special $3^{rd}$ party subscription IP address via the mobile phone 702.

The message 718 has for example a format as illustrated in table 1.

TABLE 1

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Version |  IHL  |Type of Service|          Total Length         |  |
+-+-+-+-+-+-+-+-+-+-+-+-+-+-+-+-+-+-+-+-+-+-+-+-+-+-+-+-+-+-+-+-+  |
|         Identification         |Flags|     Fragment Offset      |  |
+-+-+-+-+-+-+-+-+-+-+-+-+-+-+-+-+-+-+-+-+-+-+-+-+-+-+-+-+-+-+-+-+  |
| Time to Live  |    Protocol    |        Header Checksum         |  |
+-+-+-+-+-+-+-+-+-+-+-+-+-+-+-+-+-+-+-+-+-+-+-+-+-+-+-+-+-+-+-+-+  IP Header
|                   Source Address = T1 Address                   |  |
+-+-+-+-+-+-+-+-+-+-+-+-+-+-+-+-+-+-+-+-+-+-+-+-+-+-+-+-+-+-+-+-+  |
|                 Destination Address = DS Address                |  |
+-+-+-+-+-+-+-+-+-+-+-+-+-+-+-+-+-+-+-+-+-+-+-+-+-+-+-+-+-+-+-+-+  |
|                    Options                   |    Padding       |  |
+-+-+-+-+-+-+-+-+-+-+-+-+-+-+-+-+-+-+-+-+-+-+-+-+-+-+-+-+-+-+-+-+  |
| Next Header   |  Payload Len   |            RESERVED            |  |
+-+-+-+-+-+-+-+-+-+-+-+-+-+-+-+-+-+-+-+-+-+-+-+-+-+-+-+-+-+-+-+-+  |
|                  Security Parameters Index (SPI)                |  |
+-+-+-+-+-+-+-+-+-+-+-+-+-+-+-+-+-+-+-+-+-+-+-+-+-+-+-+-+-+-+-+-+  IPsec (AH)
|                      Sequence Number Field                      |  Header
+-+-+-+-+-+-+-+-+-+-+-+-+-+-+-+-+-+-+-+-+-+-+-+-+-+-+-+-+-+-+-+-+  |
|                                                                 |  |
+                  Security Information (Hash)                    |  |
|                                                                 |  |
```

TABLE 1-continued

```
+-+-+-+-+-+-+-+-+-+-+-+-+-+-+-+-+-+-+-+-+-+-+-+-+-+-+-+-+-+-+-+-+ - - - - - - -
| Version |   IHL   | Type of Service |          Total Length         | |          |
+-+-+-+-+-+-+-+-+-+-+-+-+-+-+-+-+-+-+-+-+-+-+-+-+-+-+-+-+-+-+-+-+ | |          |
|         Identification          | Flags |     Fragment Offset     | | Tunneled |
+-+-+-+-+-+-+-+-+-+-+-+-+-+-+-+-+-+-+-+-+-+-+-+-+-+-+-+-+-+-+-+-+ | | IPPacket |
|  Time to Live  |    Protocol    |        Header Checksum         | |          |
+-+-+-+-+-+-+-+-+-+-+-+-+-+-+-+-+-+-+-+-+-+-+-+-+-+-+-+-+-+-+-+-+ Encaps.       |
|                   Source Address = T1 Address                    | IP Header  |
+-+-+-+-+-+-+-+-+-+-+-+-+-+-+-+-+-+-+-+-+-+-+-+-+-+-+-+-+-+-+-+-+ |          |
|                 Destination Address = SS Address                 | |          |
+-+-+-+-+-+-+-+-+-+-+-+-+-+-+-+-+-+-+-+-+-+-+-+-+-+-+-+-+-+-+-+-+ |          |
|                    Options                    |    Padding      | |          |
+-+-+-+-+-+-+-+-+-+-+-+-+-+-+-+-+-+-+-+-+-+-+-+-+-+-+-+-+-+-+-+-+ - -         |
|                                                                  | Encaps.    |
+                              Payload                             | Payload    |
|                                                                  |            |
+-+-+-+-+-+-+-+-+-+-+-+-+-+-+-+-+-+-+-+-+-+-+-+-+-+-+-+-+-+-+-+-+ - - - - - - -
```

The request is being sent using IPsec tunnel mode. Accordingly, as indicated at the right hand side of table 1, the message 718 includes an IP header, an IPsec header and a tunneled IP packet including an encapsulated IP header and an encapsulated payload.

The message 718 includes as source address the IP address of the communication terminal 701 and as destination address the IP address of the data server 703. The encapsulated IP packet is addressed to the eBook download service server 704. The IPsec packet is being signed with a private key PIK provided, as illustrated in FIG. 6 by a first arrow 605, by the eBook download service provider and stored on the communication terminal 701.

The result of the signing (also referred to as security information which can in this example be seen as signing information) is included as security information in the message 718 and may include a private-key dependent hash of the tunneled IP packet or a hash of the tunneled IP packet signed with the private key. When the data provider server 703 addressed with the special $3^{rd}$ party subscription IP address receives the IPsec packet, i.e. the message 718, the data server 703 authenticates in 709 the packet using a public key PUK which has been provided to it, as illustrated by a second arrow 606 in FIG. 6, by the eBook download service provider (e.g. from the service server 704). The public key to be used for authentication is being determined from the Security Parameters Index (SPI) included in the IPsec header. The relevant SPI has been negotiated between the data provider and the eBook provider (i.e. data service provider) beforehand and has been transmitted and has been stored on the communication terminal 701 (as also illustrated by arrows 605, 606 in FIG. 6). The public key PUK corresponds to the private key PIK such that the authentication can be carried out based on the security information being generated in dependence on the private key. In other words, it is verified based on the security information that the communication terminal 701 is authorized to be provided with the service with the costs being allocated to the service provider.

In 710, after authentication, the data server 703 removes the IPsec encapsulation from the received message 718, associates the eBook download service provider's $3^{rd}$ party subscription with the data transfer in 701 (i.e. associates the cost for transmitting the request with the service provider) and sends the extracted packet 712 to the download service server 704 in 713. Thus, the eBook service provider will be charged instead of the modem's subscriber for the data transmissions in context of the eBook request.

In 714, the service server sends the requested eBook 715 to the data server 703.

In 715, when the data provider server 703 receives the requested download data (i.e. eBook 715) from the download service server 704 it checks whether the transferred data uses the same IP addresses and ports being used for the download request (i.e. for the message 718). Since the same IP addresses and ports are being used the data server 703 also associates, in 716, the eBook download service provider's $3^{rd}$ party subscription with the data transfer of the eBook 715 and charges the download service provider for the data transmission. In 717, the data server 703 sends the eBook 715 to the communication terminal 701.

In the following, another example of the operation of the communication device 200 and the communication terminal 400 is described with reference to FIGS. 8 and 9.

Figure 8:
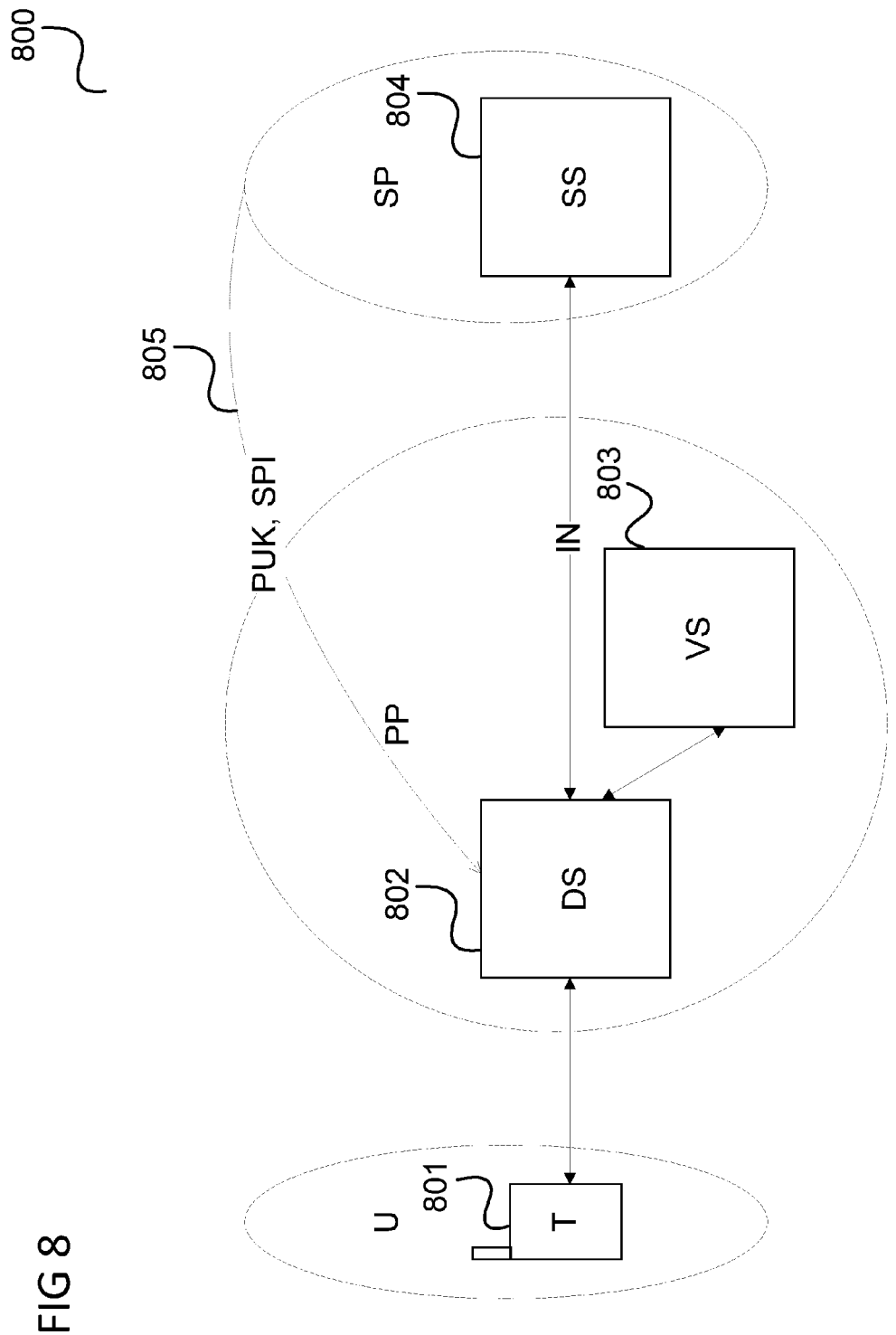
FIG. 8 shows a communication system according to an embodiment.

FIG. 8 shows a communication system 800 according to an embodiment.

The communication system 800 in this example has an architecture for business calls with third party subscription.

The communication system 800 includes a communication terminal 801, for example corresponding to the communication terminal 101 and/or the communication terminal 400, in this example a private phone of a user, a data server (or data server computer) 802, for example corresponding to the communication device 200, which is for example part of the access network 102 and connected to the communication terminal 801 via air interface 137, a VoIP (Voice over IP) server 803 and a (data) service server (or (data) service server computer 804), in this example a business call service server, for example connected to the data server 802 via the Internet.

The communication terminal 801 may be seen to be part of the user side, the data server 802 and the VoIP server 803 may be seen to be part of the data provider (or communication provider) side and the service server 804 may be seen to be part of the service provider side.

The communication terminal 801 is in this example a mobile phone using Voice over IP (VoIP) for voice calls being used by its user with a private subscription (for private use of data transmission and VoIP service). The message flow for a VoIP business call according to an embodiment is illustrated in FIG. 9.

Figure 9:
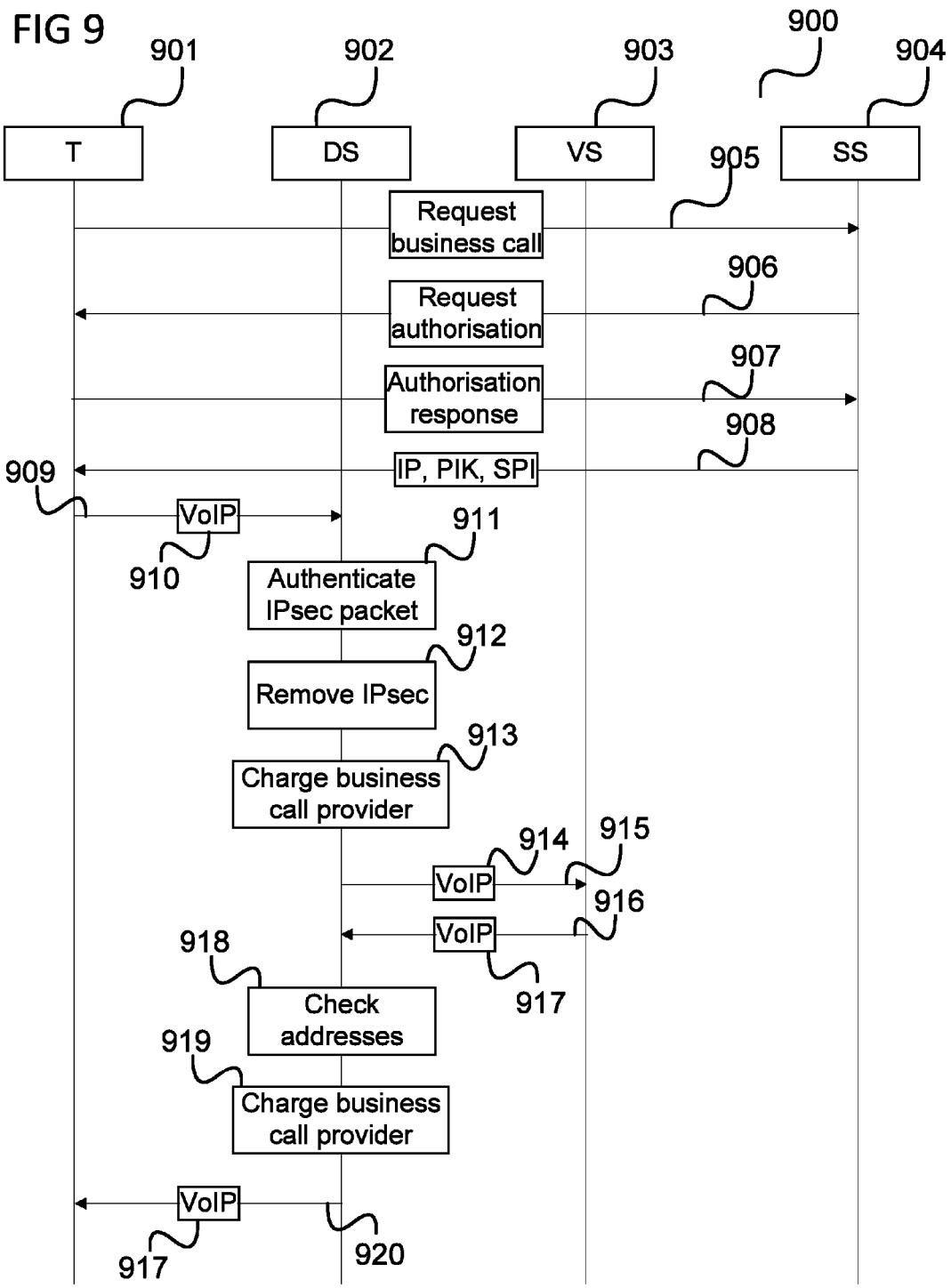
FIG. 9 shows a message flow diagram according to an embodiment.

FIG. 9 shows a message flow diagram 900 according to an embodiment.

The message flow takes place between a communication terminal 901 corresponding to the communication terminal 801, a data server 902 corresponding to the data server 802, a VoIP server 903 corresponding to the VoIP server 803, and a service server 904 corresponding to the service server 804.

It is assumed that the user wants to do a business call using his private phone, i.e. the communication terminal 901.

In 905, a VoIP application on the communication terminal 901 contacts the special business call service provider server 904. In 906, the service server 904 requests the user to authorize for the service by entering a PIN (Personal Identification Number). In 907, the communication terminal 901 responds with a PIN. After successful authorization, in 908, the service server 904 responds with a special 3$^{rd}$ party subscription IP address of the user's private service provider, with an SPI, and a private key (PIK) to be used for data signing.

In 909, the communication terminal 901 sets up a VoIP call by sending a corresponding message 910, in this case an IP packet (or, in course of the communication, analogously a plurality of messages) to the special 3$^{rd}$ party subscription IP address provided in 908. An example for a format of the message 910 is shown in table 2.

The message 910 has the IP address of the communication terminal 901 as source address and the IP address of the data server 902 as destination address. The encapsulated IP packet is being addressed to the user's private service provider's VoIP server 903. The message 910 is being signed with the private key provided by the business call service provider server 904 in 908.

The result of the signing (also referred to as security information which can in this example be seen as signing information) is included as security information in the message 910 and may include a private-key dependent hash of the tunneled IP packet or a hash of the tunneled IP packet signed with the private key.

In 911, when the private provider data server 902 addressed with the special 3$^{rd}$ party subscription IP address receives the message 910, the data server 902 authenticates the packets using a corresponding public key which has been provided to it by the business call service provider (as illustrated by arrow 805 in FIG. 8). The public key to be used for authentication is

TABLE 2

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Version |  IHL  |Type of Service|         Total Length          |  |
+-+-+-+-+-+-+-+-+-+-+-+-+-+-+-+-+-+-+-+-+-+-+-+-+-+-+-+-+-+-+-+-+  |
|         Identification        |Flags|      Fragment Offset      |  |
+-+-+-+-+-+-+-+-+-+-+-+-+-+-+-+-+-+-+-+-+-+-+-+-+-+-+-+-+-+-+-+-+  |
|  Time to Live |    Protocol   |        Header Checksum        |  |
+-+-+-+-+-+-+-+-+-+-+-+-+-+-+-+-+-+-+-+-+-+-+-+-+-+-+-+-+-+-+-+-+  IP Header
|                    Source Address = T Address                 |  |
+-+-+-+-+-+-+-+-+-+-+-+-+-+-+-+-+-+-+-+-+-+-+-+-+-+-+-+-+-+-+-+-+  |
|                  Destination Address = DS Address             |  |
+-+-+-+-+-+-+-+-+-+-+-+-+-+-+-+-+-+-+-+-+-+-+-+-+-+-+-+-+-+-+-+-+  |
|                    Options                    |    Padding    |  |
+-+-+-+-+-+-+-+-+-+-+-+-+-+-+-+-+-+-+-+-+-+-+-+-+-+-+-+-+-+-+-+-+
|  Next Header  |  Payload Len  |           RESERVED            |  |
+-+-+-+-+-+-+-+-+-+-+-+-+-+-+-+-+-+-+-+-+-+-+-+-+-+-+-+-+-+-+-+-+  |
|                 Security Parameters Index (SPI)               |  |
+-+-+-+-+-+-+-+-+-+-+-+-+-+-+-+-+-+-+-+-+-+-+-+-+-+-+-+-+-+-+-+-+  IPsec (AH)
|                     Sequence Number Field                     |  Header
+-+-+-+-+-+-+-+-+-+-+-+-+-+-+-+-+-+-+-+-+-+-+-+-+-+-+-+-+-+-+-+-+  |
|                                                               |  |
+                    Security Information (Hash)                |  |
|                                                               |  |

+-+-+-+-+-+-+-+-+-+-+-+-+-+-+-+-+-+-+-+-+-+-+-+-+-+-+-+-+-+-+-+-+ +------
| Version |  IHL  |Type of Service|         Total Length          | |       |
+-+-+-+-+-+-+-+-+-+-+-+-+-+-+-+-+-+-+-+-+-+-+-+-+-+-+-+-+-+-+-+-+ |       |
|         Identification        |Flags|      Fragment Offset      | |  Tunneled
+-+-+-+-+-+-+-+-+-+-+-+-+-+-+-+-+-+-+-+-+-+-+-+-+-+-+-+-+-+-+-+-+ |  IPPacket
|  Time to Live |    Protocol   |        Header Checksum        | |       |
+-+-+-+-+-+-+-+-+-+-+-+-+-+-+-+-+-+-+-+-+-+-+-+-+-+-+-+-+-+-+-+-+ Encaps. |
|                    Source Address = T Address                 | IP Header
+-+-+-+-+-+-+-+-+-+-+-+-+-+-+-+-+-+-+-+-+-+-+-+-+-+-+-+-+-+-+-+-+ |       |
|                  Destination Address = VS Address             | |       |
+-+-+-+-+-+-+-+-+-+-+-+-+-+-+-+-+-+-+-+-+-+-+-+-+-+-+-+-+-+-+-+-+ |       |
|                    Options                    |    Padding    | |       |
+-+-+-+-+-+-+-+-+-+-+-+-+-+-+-+-+-+-+-+-+-+-+-+-+-+-+-+-+-+-+-+-+         |
|                                                               | Encaps. |
|                                                               | Payload |
+                             Payload                           |         |
|                                                               | |       |
+-+-+-+-+-+-+-+-+-+-+-+-+-+-+-+-+-+-+-+-+-+-+-+-+-+-+-+-+-+-+-+-+ +------
```

The message 910 is sent using IPsec tunnel mode. Accordingly, as indicated at the right hand side of table 2, the message 910 includes an IP header, an IPsec header and a tunneled IP packet including an encapsulated IP header and an encapsulated payload.

being determined from the Security Parameters Index (SPI) included in the IPsec header. The public key PUK corresponds to the private key PIK such that the authentication can be carried out based on the security information being generated in dependence on the private key. In other words, it is verified based on the security information that the communication terminal 901 is authorized to be provided with the service with the costs being allocated to the service provider.

The relevant SPI has been negotiated between private provider and business call service provider beforehand and has for example been sent to the communication terminal 901 from the business call service server 904 when authorizing for the service.

In 912, after authentication, the private provider data server 902 removes the IPsec encapsulation from the received message 910, associates the business call service provider's $3^{rd}$ party subscription with the call in 913 and sends the extracted IP packet 914 to the private VoIP server 903 in 915. Thus, the business call service provider (e.g. operating the service server 904) is charged instead of the private user for the call (i.e. for the transmission of the message 910).

When the private provider data server 902 receives VoIP data 917 transmitted by the private VoIP server 903 in 916 it checks, in 918, whether the transferred VoIP data 917 uses the same IP addresses and ports being used for the business call request (i.e. the message 910). Since the same IP addresses and ports are being used the private data server 902 also associates the business call service provider's $3^{rd}$ party subscription with the VoIP call and charges, in 919, the business call service provider for the transmission of the VoIP data.

In 920, the VoIP data 917 is forwarded to the communication terminal 901.

A further example is described in the following with reference to FIGS. 10 and 11.

Figure 10:
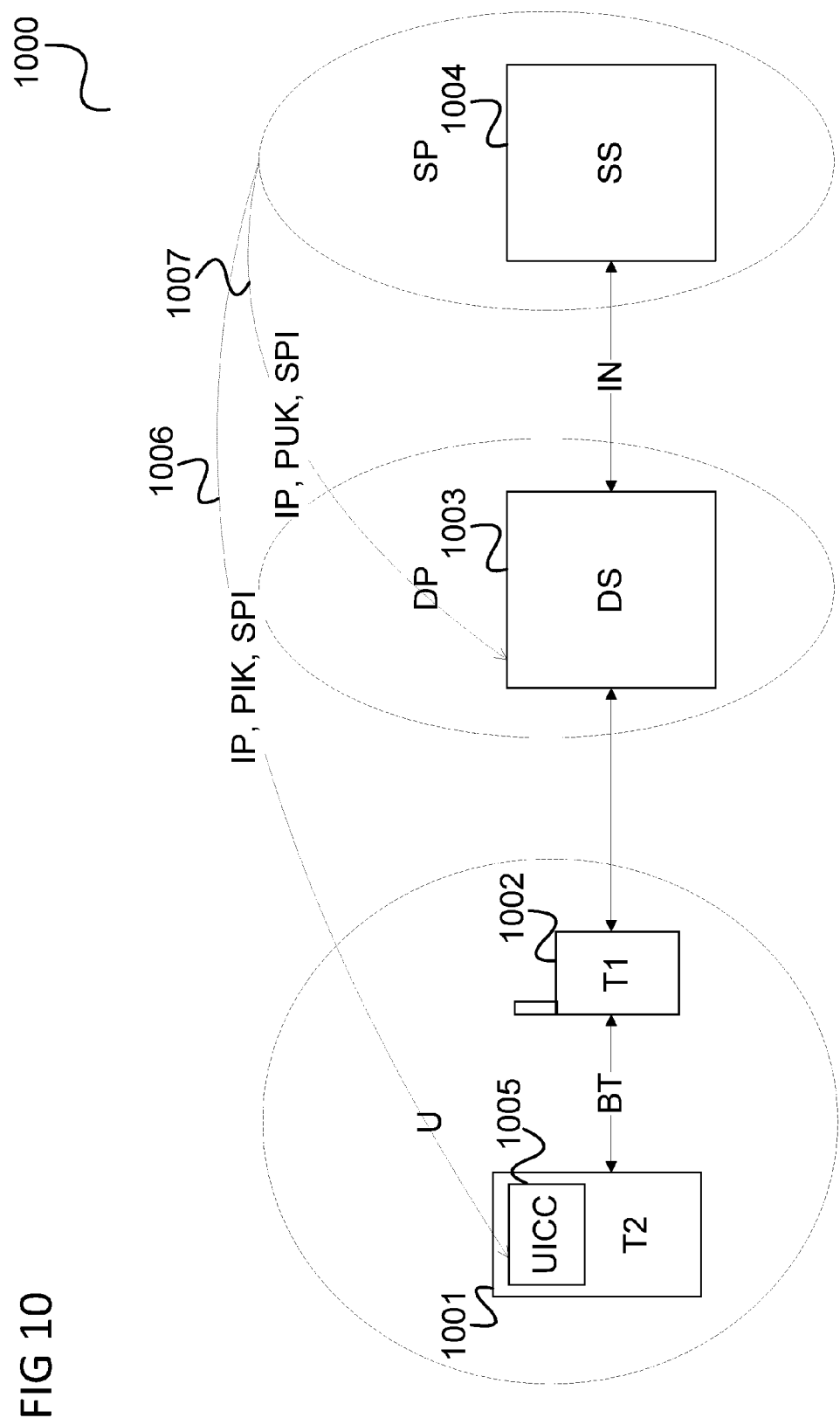
FIG. 10 shows a communication system according to an embodiment.

FIG. 10 shows a communication system 1000 according to an embodiment.

The communication system 1000 in this example has an architecture for a traffic data service with third party subscription.

The communication system 1000 includes a communication terminal 1001, for example corresponding to the communication terminal 101 and/or the communication terminal 400, a modem device 1002, in this example an automotive diagnosis device with integrated modem, connected to the communication terminal 1001 via Bluetooth, a data server (or data server computer) 1003, for example corresponding to the communication device 200, which is for example part of the access network 102 and connected to the modem device 1002 via air interface 137, and a (data) service server (or (data) service server computer) 1004, in this example an traffic data service server, for example connected to the data server 1003 via the Internet.

The communication terminal 1001 and the modem device 1002 may be seen to be part of the user side, the data server 1003 may be seen to be part of the data provider (or communication provider) side and the service server 1004 may be seen to be part of the service provider side.

The communication terminal 1001 is in this example a navigation device in an automobile having a remote diagnosis system, i.e. modem device 1002. The diagnosis system (i.e. modem device 1002) includes a wireless modem to connect to the automobile manufacturer and to the user's garage to submit diagnosis information and to receive notifications (e.g. to alert the user on required maintenance). The user U for example temporarily installs the communication terminal 1001 (i.e. his navigation device) in the automobile. The communication terminal 1001 is assumed to be capable of taking into account recent traffic data. For receiving traffic data the communication terminal 1001 connects via Bluetooth to the modem device 1002 (specifically to the wireless modem of the modem device 1002).

The message flow for receiving traffic data according to an embodiment is illustrated in FIG. 11.

FIG. 11 shows a message flow diagram 1100 according to an embodiment.

The message flow takes place between a communication terminal 1101 corresponding to the communication terminal 1001, a modem device 1102 corresponding to the modem device 1002, a data server 1103 corresponding to the data server 1003, and a service server 1104 corresponding to the service server 1004.

It is assumed that the communication terminal 1101 (in this example a navigation device) is connected to the Internet via the wireless modem of the modem device 1102. It is further assumed that the communication terminal 1101 wants to receive traffic data updates.

In 1105, the communication terminal 1101 sends a traffic data request message 1106 to the traffic data service provider's service server 1104 using the modem device 1102. The communication terminal 1101 knows the address of the traffic data server 1104 from a UICC 1005 (illustrated in FIG. 10) inserted in the communication terminal 1101. The UICC 1005 and information stored thereon has for example been provided by the traffic data service provider to the user (as illustrated by a first arrow 1006 in FIG. 10). An example for a possible format of the message 1106 is given in table 3.

TABLE 3

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Version |  IHL  | Type of Service |         Total Length         |
+-+-+-+-+-+-+-+-+-+-+-+-+-+-+-+-+-+-+-+-+-+-+-+-+-+-+-+-+-+-+-+-+
|         Identification          | Flags |    Fragment Offset    |
+-+-+-+-+-+-+-+-+-+-+-+-+-+-+-+-+-+-+-+-+-+-+-+-+-+-+-+-+-+-+-+-+
|  Time to Live   |    Protocol    |        Header Checksum        |   IP Header
+-+-+-+-+-+-+-+-+-+-+-+-+-+-+-+-+-+-+-+-+-+-+-+-+-+-+-+-+-+-+-+-+
|                    Source Address = T2 Address                  |
+-+-+-+-+-+-+-+-+-+-+-+-+-+-+-+-+-+-+-+-+-+-+-+-+-+-+-+-+-+-+-+-+
|                  Destination Address = SS Address               |
+-+-+-+-+-+-+-+-+-+-+-+-+-+-+-+-+-+-+-+-+-+-+-+-+-+-+-+-+-+-+-+-+
|                    Options                    |    Padding      |
+-+-+-+-+-+-+-+-+-+-+-+-+-+-+-+-+-+-+-+-+-+-+-+-+-+-+-+-+-+-+-+-+
|  Next Header    |  Payload Len   |           RESERVED            |
+-+-+-+-+-+-+-+-+-+-+-+-+-+-+-+-+-+-+-+-+-+-+-+-+-+-+-+-+-+-+-+-+
|                   Security Parameters Index (SPI)               |
+-+-+-+-+-+-+-+-+-+-+-+-+-+-+-+-+-+-+-+-+-+-+-+-+-+-+-+-+-+-+-+-+   IPsec (AH)
|                      Sequence Number Field                      |   Header
```

TABLE 3-continued

```
+-+-+-+-+-+-+-+-+-+-+-+-+-+-+-+-+-+-+-+-+-+-+-+-+-+-+-+-+-+-+-+-+    |
|                                                                |    |
+               Security Information (Hash)                      |    |
|                                                                |    |
+-+-+-+-+-+-+-+-+-+-+-+-+-+-+-+-+-+-+-+-+-+-+-+-+-+-+-+-+-+-+-+-+----
|                                                                | Encaps.
+                         Payload                                | Payload
|                                                                |    |
+-+-+-+-+-+-+-+-+-+-+-+-+-+-+-+-+-+-+-+-+-+-+-+-+-+-+-+-+-+-+-+-+----
```

The message 1106 is being sent using IPsec transport mode. Accordingly, as indicated at the right hand side of table 3, the message 1106 includes an IP header, an IPsec header and an encapsulated payload. The message 1106 is signed with a private key (PIK) also provided by the traffic data service provider on the UICC.

The result of the signing (also referred to as security information which can in this example be seen as signing information) is included as security information in the message 1106 and may include a private-key dependent hash of the payload or a hash of the payload signed with the private key.

The message 1106 includes as source address the IP address of the communication terminal 1101 and as destination address the IP address of the service server 1104.

The message 1106 is routed via the data provider's data server 1103. In 1107, when the data provider server 1103 receives the message 1106 from the modem device 1102, the data server 1103 checks the destination IP address. Since the destination address of the message 1106 is the address of the service server 1104 of a $3^{rd}$ party subscriber (in this case the provider of the traffic data) the data server 1103 authenticates, in 1108, the message 1106 using a public key PUK being provided by the traffic data provider beforehand as illustrated by the second arrow 1007 in FIG. 10. The public key PUK corresponds to the private key PIK such that the authentication can be carried out based on the security information being generated in dependence on the private key. In other words, it is verified based on the security information that the communication terminal 1101 is authorized to be provided with the service with the costs being allocated to the service provider.

In 1109, after authentication, the data provider server 1103 removes the IPsec Header from the received message 1106, associates, in 1110, the traffic data service provider's $3^{rd}$ party subscription with the data transfer and sends the resulting packet 1111 to the traffic data service server 1104 in 1112. Thus, the traffic data service provider will be charged instead of the modem's subscriber (i.e. the automobile manufacturer) for the transmission of the request for traffic data.

In 1113, the service server 1104 sends the requested traffic data 1114 to the data server 1103. When the data provider server 1103 receives the requested traffic data from the traffic data service server 1104 it checks, in 1115, whether the transferred traffic data 1114 uses the same IP addresses and ports being used for the traffic data request message 1106. Since the same IP addresses and ports are being used the data server 1103 also associates, in 1116, the traffic data service provider's $3^{rd}$ party subscription with the transfer of the traffic data 1114 and charges the traffic data service provider for the transmission of the traffic data 1114. In 1117, the data server 1103 forwards the traffic data 1114 to the communication terminal 1101 via the mobile device 1102.

It should be noted that embodiments may use other security protocols than IPsec. In particular transport layer security protocols like SSL/TLS may be employed or application layer security protocols like HTTPS might be used.

Further, according to one embodiment, in IPsec transport mode IPsec encapsulation is not removed by the data server 703, 902, 1103. In this case IPsec may also be used by the application service provider for authentication/authorization purposes.

In one embodiment, if a IPsec transport mode packet is not properly authenticated by the data server 703, 902, 1103 then the packet may still be routed to its destination address. In this case the modem's subscriber is being charged for the data transmission. Before forwarding an unauthenticated packet the user might be asked whether he is willing to pay for the data transmission.

According to one embodiment, if an IPsec packet is not properly authenticated by the data server 703, 902, 1103 then the packet is not forwarded to its destination address. The user may be alerted that the data transmission is being barred.

It should further be noted that the messages 708, 910, 1106 may each correspond to a plurality of packets, e.g. IPsec packets.

According to an embodiment, a signed IP packet may be routed depending on its signature. Routing may be done such that special servers are being visited for service provisioning or charging purposes. For example, a special $3^{rd}$ party charging service server (outside the data provider) may be visited.

According to one embodiment, instead or in addition to signing the $3^{rd}$ party subscription data the data may be encrypted. For the encryption IPsec encryption may be used. The encryption may be done using a private key of the communication terminal. Thus, according to one embodiment, the security information may be encrypted data, e.g. data encrypted with a private or public key. The receiver can then verify whether the request for the service was sent by an authorized sender by decrypting the encrypted data and checking whether the decrypted data is meaningful (which is with high probability not the case if the data has been encrypted with a wrong key, i.e. not with the correct private or public key). The checking whether the decrypted data is meaningful may for example be the usual processing of the request which leads to an error if the request is not meaningful (e.g. has improper format, is missing necessary information or includes meaningless information).

In the examples described above with reference to FIGS. 6 to 9, the $3^{rd}$ party subscription is being identified by the IPsec packet's destination address and SPI. In the example described with reference to FIGS. 10 and 11 the $3^{rd}$ party subscription is being identified by the IPsec packet's destination address. $3^{rd}$ party subscriptions might also be identified by security information (e.g. hash values) provided in IPsec packets. In this case the server checks authentication using several possible public keys and chooses the $3^{rd}$ party subscription whose public key validates the IPsec packet.

Embodiments may also be used for wired communication services, i.e. data communication needs not necessarily be provided by a wireless communication network.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device comprising:
    a receiver configured to receive a message from a communication terminal indicating that the communication terminal requests a data service and indicating that a cost of a communication connection to provide the data service is to be allocated to a provider of the data service and including security information, wherein the security information comprises authentication information which allows the receiver to check whether the communication terminal is authorized to be provided with the requested data service with the cost of the communication connection to provide the data service being allocated to the provider of the data service;
    a determining circuit configured to determine, based on the security information, whether the communication terminal is authorized to be provided with the requested data service with the cost of the communication connection to provide the data service being allocated to the provider of the data service;
    a controller, configured to establish a communication connection to provide the data service and to allocate the cost of the communication connection to the provider of the data service if it has been determined that the communication terminal is authorized to be provided with the requested data service with the cost of the communication connection to provide the data service being allocated to the provider of the data service,
    wherein the communication device is separate and distinct from the provider of the data service and is to receive data, corresponding to the data service, from the provider of the data service and to provide the data to the communication terminal via the communication connection.

2. The communication device according to claim 1, wherein the provider of the data service is a service server device.

3. The communication device according to claim 1, being part of a communication network.

4. The communication device according to claim 3, wherein the controller is configured to control a component of a communication network to establish the communication connection.

5. The communication device according to claim 3, wherein the provider of the data service is a subscriber of the communication network.

6. The communication device according to claim 3, wherein the communication terminal is a user terminal of the communication network.

7. The communication device according to claim 1, wherein the message indicates that a cost of the data service is to be allocated to the provider of the data service by a destination address of the message.

8. The communication device according to claim 7, wherein the address is an address of the communication device or of a service server device providing data to be communicated in the data service.

9. The communication device according to claim 7, wherein the destination address is an IP address.

10. The communication device according to claim 1, wherein the security information is signing information.

11. The communication device according to claim 1, wherein the security information is a hash of at least a part of the message.

12. The communication device according to claim 1, wherein the message is an IPsec message.

13. The communication device according to claim 1, wherein the security information comprises at least one of at least a part of the message being signed with a private key and a hash value of at least a part of the message being signed with a private key.

14. The communication device according to claim 12, wherein the determining circuit is configured to determine whether the communication terminal is authorized to be provided with the requested data service with the cost of the communication connection to provide the data service being allocated to the provider of the data service using a public key corresponding to the private key.

15. A method of operating a communication device, the method comprising:
    receiving a message from a communication terminal indicating that the communication terminal requests a data service and indicating that a cost of a communication connection to provide the data service is to be allocated to a provider of the data service and including security information, wherein the security information comprises authentication information which allows the receiver to check whether the communication terminal is authorized to be provided with the requested data service with the cost of the communication connection to provide the data service being allocated to the provider of the data service;
    determining, based on the security information, whether the communication terminal is authorized to be provided with the requested data service with the cost of the communication connection to provide the data service being allocated to the provider of the data service;
    establishing a communication connection to provide the data service and allocating a cost of the communication connection to the provider of the data service if it has been determined that the communication terminal is authorized to be provided with the requested data service with the cost of the communication connection to provide the data service being allocated to the provider of the data service; and
    receiving data, corresponding to the data service, from the provider of the data service and to provide the data to the communication terminal via the communication connection,
    wherein the communication device is separate and distinct from the provider of the data service.

16. A communication terminal comprising:
    a generating circuit configured to generate a message indicating that the communication terminal requests a data service and indicating that a cost of a communication connection to provide the data service is to be allocated to a provider of the data service and including security information, which comprises authentication information, which allows a receiver to check whether the communication terminal is authorized to be provided with the requested data service with the cost of the communication connection to provide the data service being allocated to the provider of the data service, allowing determination whether the communication terminal is authorized to be provided with the requested data service with a cost of the communication connection to provide the data service being allocated to the provider of the data service;

a sender configured to send the message to a communication device, wherein the communication device is separate and distinct from the provider of the data service.

17. A method for requesting a data service comprising:

generating a message which indicates that the communication terminal requests a data service and which indicates that a cost of a communication connection to provide the data service is to be allocated to a provider of the data service and including security information which comprises authentication information, which allows the receiver to check whether the communication terminal is authorized to be provided with the requested data service with a cost of the communication connection to provide the data service being allocated to a the provider of the data service, allowing determination whether the communication terminal is authorized to be provided with the requested data service with the cost of the communication connection to provide the data service being allocated to the provider of the data service;

sending the message to a communication device, wherein the communication device is separate and distinct from the provider of the data service.

\* \* \* \* \*